US012521865B2

(12) United States Patent
Hickey

(10) Patent No.: US 12,521,865 B2
(45) Date of Patent: Jan. 13, 2026

(54) TOOLSET ORGANIZER

(71) Applicant: Bryan Hickey, Ninilchik, AK (US)

(72) Inventor: Bryan Hickey, Ninilchik, AK (US)

( * ) Notice: Subject to any disclaimer, the term of this patent is extended or adjusted under 35 U.S.C. 154(b) by 0 days.

(21) Appl. No.: 18/885,549

(22) Filed: Sep. 13, 2024

(65) Prior Publication Data

US 2025/0001577 A1 Jan. 2, 2025

Related U.S. Application Data

(63) Continuation-in-part of application No. 17/819,148, filed on Aug. 11, 2022, now Pat. No. 12,115,647.

(51) Int. Cl.
*B25H 3/00* (2006.01)

(52) U.S. Cl.
CPC .................................... *B25H 3/00* (2013.01)

(58) Field of Classification Search
CPC ... B25H 3/04; B25H 3/06; B25H 3/00; B65D 25/101; B65D 85/20; A47F 7/00
USPC ................................................ 206/376, 372
See application file for complete search history.

(56) References Cited

U.S. PATENT DOCUMENTS 1,266,749 A 5/1918 Abbott
1,750,011 A * 3/1930 Kneier .................... B25B 13/56 206/375
2,068,308 A 1/1937 Zerver
2,482,402 A 9/1949 Corcodilos
2,981,009 A 4/1961 Lindquist
3,197,034 A 7/1965 Deadrick
3,383,941 A 5/1968 Nielsen
3,517,824 A 6/1970 Paque
3,635,352 A 1/1972 Brooks
3,783,801 A 1/1974 Engman
3,831,533 A 8/1974 Kellogg
4,158,336 A 6/1979 Brescia
4,275,666 A 6/1981 Schriever
4,337,860 A 7/1982 Carrigan
4,497,405 A 2/1985 Mikic
4,519,892 A 5/1985 Blakeslee
4,771,895 A 9/1988 Steiner
4,852,501 A 8/1989 Olson
4,936,472 A 6/1990 Meier
D312,017 S * 11/1990 Gould ............................ D6/552
5,020,666 A 6/1991 Barlean
5,040,681 A 8/1991 Grusin
5,108,141 A 4/1992 Anderson
(Continued)

*Primary Examiner* — Ernesto A Grano
(74) *Attorney, Agent, or Firm* — Fargo Patent & Business Law; Thomas Kading

(57) ABSTRACT

A toolset organizer for organizing box-end wrenches includes a multiple of connectors each comprising a male polygon section connector body adjacent to a flange along an axis, each male polygon section connector body different in size, each of the multiple of connectors at least partially receivable into another of the multiple of connectors along the axis; and a cylindrical section that extends from the male polygon section connector body along the axis of each of the multiple of connectors, the cylindrical section contains a first magnet such that the cylindrical section receivable into an opening through the flange and at least partially into the male polygon section connector body of only one of the multiple of connectors that each respectively contains a magnet to provide a magnetic interface that at least partially retains the multiple of connectors one to another.

7 Claims, 4 Drawing Sheets

(56) References Cited

U.S. PATENT DOCUMENTS 5,176,465 A 1/1993 Hoisted
5,219,081 A 6/1993 Lin
5,318,189 A 6/1994 Lee
5,346,063 A * 9/1994 Chow ...................... B25H 3/04 206/483
5,401,200 A 3/1995 Ellis
5,505,316 A * 4/1996 Lee .......................... B25H 3/04 211/175
5,638,964 A * 6/1997 Ernst ........................ B25H 3/04 211/70.6
5,715,948 A 2/1998 Hung
D392,489 S * 3/1998 Ernst .............................. D6/571
5,967,340 A * 10/1999 Kao ......................... B25H 3/04 294/146
6,070,743 A 6/2000 Hsueh
6,126,004 A * 10/2000 Ling ........................ B25H 3/04 206/378
6,158,360 A 12/2000 Cheng
6,196,398 B1 3/2001 Lowe
6,202,864 B1 * 3/2001 Ernst ....................... A47F 7/024 206/372
6,206,493 B1 3/2001 Sanchez-Levin
6,273,277 B1 8/2001 Geldenhuys
6,305,542 B1 * 10/2001 Barbrow .................. B25H 3/04 206/375
6,308,838 B1 10/2001 Endean
6,315,121 B1 * 11/2001 Hansen .................... B25H 3/04 206/451
6,360,892 B1 * 3/2002 Chen ........................ B25H 3/04 211/70.6
6,401,923 B1 * 6/2002 Huang ..................... B25H 3/04 206/480
6,425,490 B1 7/2002 Ta
6,536,611 B2 * 3/2003 Chen ..................... A47F 7/0028 211/70.6
6,568,546 B1 5/2003 Huang
6,575,312 B2 6/2003 Santa Cruz
6,722,511 B1 4/2004 Lowe
6,758,350 B2 * 7/2004 Lin .......................... B25H 3/04 294/169
6,796,565 B2 9/2004 Choi
6,832,685 B2 12/2004 Chang
6,976,582 B2 * 12/2005 Chen ........................ B25H 3/04 206/480
6,996,927 B2 2/2006 Meidinger
7,144,610 B1 12/2006 Estes
7,178,670 B2 * 2/2007 Chen ........................ B25H 3/04 211/70.6
7,424,951 B2 * 9/2008 Hu ..................... B65D 73/0042 206/349
7,537,124 B2 * 5/2009 Chen ........................ B25H 3/04 211/70.6
7,798,076 B1 9/2010 Neff
7,938,261 B1 * 5/2011 Lee .................... B65D 73/0014 206/349
7,975,855 B2 7/2011 Lin
8,016,130 B2 * 9/2011 Cheng ...................... B25H 3/04 206/349
8,061,536 B2 11/2011 Lin
8,069,997 B2 12/2011 Cheng
8,240,488 B2 8/2012 Huang
8,286,807 B2 * 10/2012 Winnard ................ B25H 3/003 211/70.6
8,316,765 B2 11/2012 Blanks
8,371,456 B2 2/2013 Scadden
8,403,155 B1 * 3/2013 Kao ......................... B25H 3/04 211/70.6
8,408,388 B1 * 4/2013 Chen .................... B65D 25/103 206/45.24
8,870,133 B1 10/2014 Brown
D734,612 S * 7/2015 Liu ................................ D3/315
D744,751 S * 12/2015 Weng ............................. D3/288
9,538,861 B2 1/2017 Young
9,694,491 B1 * 7/2017 Kao ....................... B25H 3/003
10,040,189 B2 * 8/2018 Kao ...................... A47F 7/0028
11,103,989 B2 * 8/2021 Hurley .................. H01F 7/0252
11,110,589 B2 * 9/2021 Hurley .................. H01F 7/0252
11,712,794 B1 8/2023 Lai
2002/0121491 A1 * 9/2002 Ernst ........................ B25H 3/04 206/372
2003/0071000 A1 4/2003 Maser
2003/0141266 A1 * 7/2003 Lin .......................... B25H 3/04 211/70.6
2005/0051446 A1 * 3/2005 Chen ........................ B25H 3/04 206/349
2006/0065613 A1 3/2006 McKay
2006/0070968 A1 4/2006 Terhune
2006/0096878 A1 * 5/2006 Chen ........................ B25H 3/04 206/376
2006/0108300 A1 * 5/2006 Lin ....................... A47F 7/0028 211/70.6
2006/0118500 A1 * 6/2006 Chen ..................... A47F 7/0028 211/70.6
2006/0138066 A1 6/2006 Hung
2008/0000865 A1 1/2008 Babcock
2008/0041799 A1 2/2008 Nguy
2008/0061020 A1 3/2008 Kaisler
2008/0156754 A1 * 7/2008 Cheng ...................... B25H 3/04 211/70.6
2008/0197131 A1 8/2008 Lin
2009/0218302 A1 * 9/2009 Winnard ................ B25H 3/003 211/70.6
2010/0163502 A1 * 7/2010 Chang ...................... B25H 3/04 211/70.6
2011/0048989 A1 * 3/2011 Winnard .................. B25H 3/06 206/349
2012/0138497 A1 * 6/2012 Lee .......................... B25H 3/04 206/376
2013/0240394 A1 9/2013 Wang
2015/0233639 A1 8/2015 Mustari
2016/0176596 A1 6/2016 Kuipers
2017/0190047 A1 * 7/2017 Kao .......................... F16B 1/00
2019/0254424 A1 8/2019 Rassat
2023/0110104 A1 4/2023 Ingram
2023/0244636 A1 8/2023 Russell
2024/0051114 A1 2/2024 Hickey
2025/0083297 A1 * 3/2025 Dominguez ............. B25H 3/00

* cited by examiner

TOOLSET ORGANIZER

CROSS-REFERENCE TO RELATED APPLICATION(S)

This application claims the priority as a continuation-in-part of U.S. Nonprovisional patent application Ser. No. 17/819,148 (01609-HIC) filed Aug. 11, 2022. Each of the aforementioned patent applications, and any applications related thereto, are herein incorporated by reference in their entirety.

FIELD

The present application generally relates to a toolset organizer that organizes wrenches.

BACKGROUND

Toolboxes often contain various tools, however, often become somewhat unorganized. Although wrench trays, racks, or compartment slots facilitate organization of tools, these devices may be bulky and waste space within the toolbox and not allow for varying the quantity of wrenches to be organized/secured.

SUMMARY

A toolset organizer for organizing box-end wrenches according to one disclosed non-limiting embodiment of the present disclosure includes a multiple of connectors each comprising a male polygon section connector body adjacent to a flange along an axis, each male polygon section connector body different in size, each of the multiple of connectors at least partially receivable into another of the multiple of connectors along the axis; and a cylindrical section that extends from the male polygon section connector body along the axis of each of the multiple of connectors, the cylindrical section contains a first magnet such that the cylindrical section receivable into an opening through the flange and at least partially into the male polygon section connector body of only one of the multiple of connectors that each respectively contains a magnet to provide a magnetic interface that at least partially retains the multiple of connectors one to another.

A further embodiment of any of the foregoing embodiments of the present disclosure includes, wherein each male polygon section connector body comprises a hexagon different in size to receive only a single respective box-end wrench.

A further embodiment of any of the foregoing embodiments of the present disclosure includes, wherein each of the multiple of connectors are independently rotatable about the axis relative to the other of the multiple of connectors.

A further embodiment of any of the foregoing embodiments of the present disclosure includes, wherein ridges on each cylindrical section.

A toolset organizer for organizing box-end wrenches according to one disclosed non-limiting embodiment of the present disclosure includes a multiple of connectors each comprising a male polygon section connector body adjacent to a flange along an axis, each male polygon section connector body different in size, each of the multiple of connectors at least partially receivable into another of the multiple of connectors along the axis.

A further embodiment of any of the foregoing embodiments of the present disclosure includes ridges on each cylindrical section.

A further embodiment of any of the foregoing embodiments of the present disclosure includes, wherein the male polygon section connector body comprises a hexagon.

A further embodiment of any of the foregoing embodiments of the present disclosure includes, wherein each of the multiple of connectors is magnetically retained into another of the multiple of connectors along the axis.

A first connector of a toolset organizer for organizing box-end wrenches according to one disclosed non-limiting embodiment of the present disclosure includes a first male polygon section connector body along an axis, the first male polygon section connector body sized to receive a first box-end wrench; a first flange along the axis adjacent to the first male polygon section connector body, the first flange of diameter greater than that of the first male polygon section connector body; a first cylindrical section that extends from the first male polygon section connector body along the axis; and an opening formed through the first flange and at least partially into the first male polygon section connector body to define a female connector portion opening to receive a second connector which comprises a second male polygon section connector body sized to receive a second box-end wrench of a size different than the first box-end wrench.

A further embodiment of any of the foregoing embodiments of the present disclosure includes, wherein the first cylindrical section comprises cylindrical ridges.

A further embodiment of any of the foregoing embodiments of the present disclosure includes, wherein the first cylindrical section is sized to fit within an opening formed through a second flange and at least partially into the second male polygon section connector body of the second connector along the axis.

A further embodiment of any of the foregoing embodiments of the present disclosure includes, wherein the opening formed through the second flange and at least partially into the second male polygon section connector body of the second connector comprises cylindrical ridges to facilitate retention with the first cylindrical section along the axis.

A further embodiment of any of the foregoing embodiments of the present disclosure includes, wherein the first cylindrical section contains a magnet.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
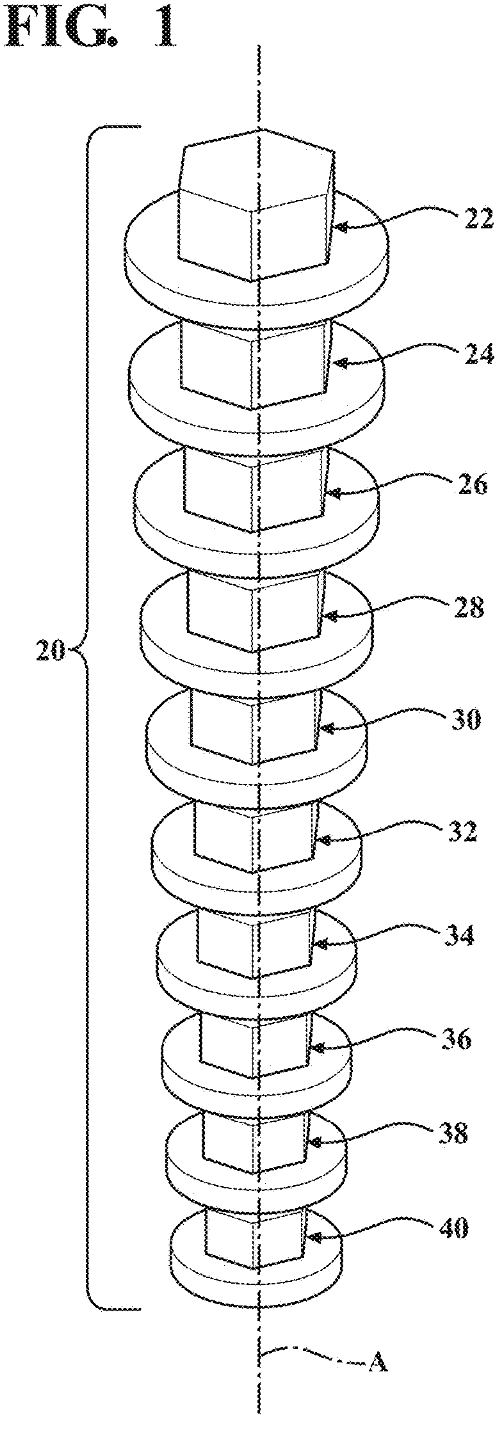
FIG. 1 is a perspective view of a toolset organizer with a multiple of connectors connected together according to one disclosed non-limiting embodiment.

FIG. 1 illustrates an example embodiment of the toolset organizer 20. The toolset organizer 20 includes a multiple of connectors 22, 24, 26, 28, 30, 32, 34, 36, 38, 40, each of which are connectable together. Although a particular number of connectors are illustrated in the disclosed embodiment, it would be appreciated that any number thereof may form the organizer 20. Each connector, is friction fit to essentially "snap" into an adjacent connector to retain a tool such as a box-end wrench between each adjacent pair of connectors 22, 24, 26, 28, 30, 32, 34, 36, 38, 40 with the ability to rotate the tool on a respective connector 22, 24, 26, 28, 30, 32, 34, 36, 38, 40, 42 about an axis A while retaining the other connectors together. Each connector 22, 24, 26, 28, 30, 32, 34, 36, 38, 40 may be progressively sized to accommodate a full set of tools such as a box-end wrench set. The toolset organizer 20 provides ease of wrench accessibility, identification, and transportation, and allows users to rotate desired wrenches individually while maintaining other wrenches in a desired locked or flushed position.

The first connector 24 is exemplary of each of the connectors and generally includes a first male interface 24*a*, a first male polygon section connector body 24*b* adjacent to a second flange 24*c* along axis A. The first male polygon section connector body 24*b* may be specific to the tool such as a hexagonal wrench. A second female interface 24*d* is formed through the second flange 24*c* and at least partially into the first male polygon section connector body 24*b* to receive and retain a second male interface 26*a* of a second connector 26 along the axis. The corresponding male and female interfaces may be formed as, for example, a complimentary truncated conical section, a complimentary cylindrical section, or other geometric configuration which provide a mating interface.

Although the first connector 24 is exemplary of each of the connectors, a connector may be a polygon end cap 22 that need not include the male interface portion. The connector polygon end cap 22 may include a first flange 22*c* along axis A to define a first female interface 22*d* to receive and retain the first male interface 24*a* of a first connector 24 along the axis A.

The first male polygon section connector body 24*b* may be sized to receive a first box-end wrench 50, where the first box-end wrench 50 is placed onto the first male polygon section connector body 24*b*, so that the first box-end wrench 50 is retained between the first flange 22*c* and second flange 24*c*.

The second male interface 26*a* is sized to fit within the first female interface 22*d* formed through a second flange 24*c* and at least partially into the second male polygon section connector body 26*b* of the second connector 26 along the axis A. The second male polygon section connector body 26*b* is adjacent to the second flange 24*c* of the second connector 26 along the axis A, the second male polygon section connector body 26*b* is sized to receive a second box-end wrench 52, where the second male polygon section connector body 26*b* is different than the first male polygon section connector body 24*b*. The third through ninth connectors of the illustrated embodiment follow the same pattern as described above.

Figure 2:
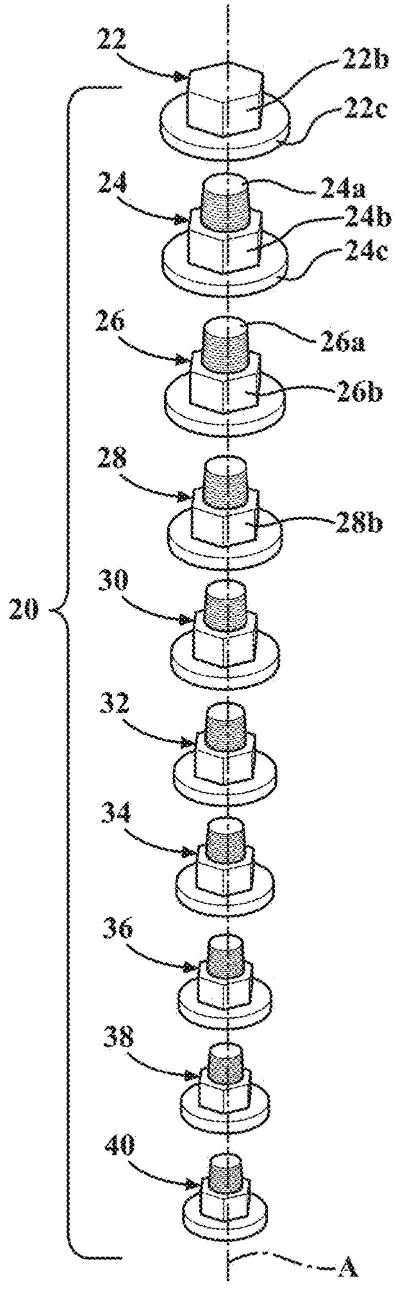
FIG. 2 is an exploded view of the toolset organizer in which the connectors proportionately increase in size.

With reference to FIG. 2, the connectors are shown separated along the axis A, such that the connectors decrease in size from top to bottom as shown in FIG. 2. The ninth connector 40 in this embodiment is the smallest connector to receive the smallest tool of the toolset. This is followed by the eight connector 38, seventh connector 36, sixth connector 34, fifth connector 32, fourth connector 30, third connector 28, second connector 26, first connector 24, and ending with the polygon end cap 22.

Figure 3A:
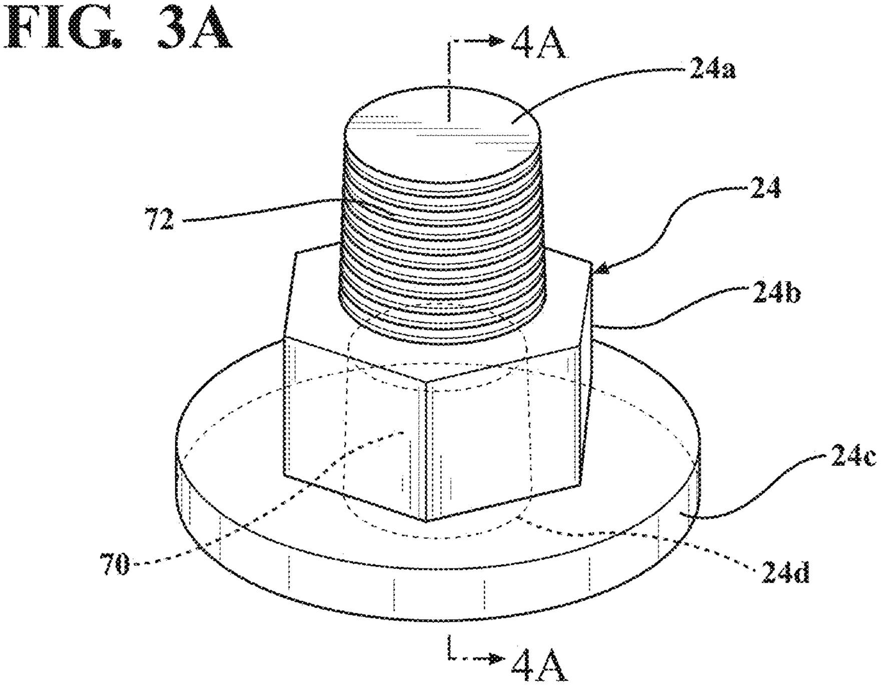
FIG. 3A is a perspective view of a connector according to one disclosed non-limiting embodiment.

With reference to FIG. 3A, the first male interface 24*a* that is adjacent to the first male polygon section connector body 24*b* has first male interface ridges 72 that insert into a first female interface ridges 70 (FIG. 4A) that allow for retention between the connectors. Once the connectors are snapped together, a tool may be retained axially between a pair of connectors on the polygonal section but may also be individually rotated with respect to other tools.

Figure 4A:
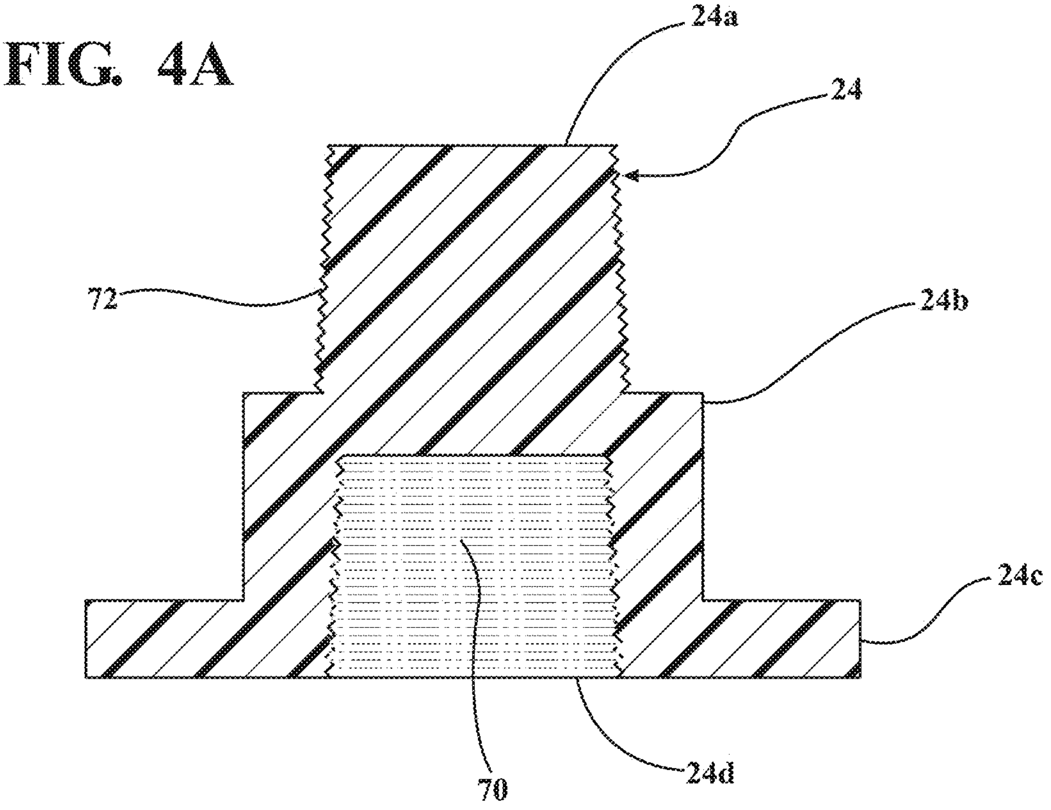
FIG. 4A is a schematic cross-sectional view of the connector of FIG. 3A according to one disclosed non-limiting embodiment.

With reference to FIG. 4A, the first male interface ridges 72 from the first male interface 24*a* for both the first connector 24 and the polygon end cap 22 provide for an interface therebetween. The first male interface 24*a* of the first connector 24 is inserted into and penetrates the first female interface 22*d* of the polygon end cap 22. Both the first flange 22*c* and the second flange 24*c* serve as reference points to illustrate the depth of how the top of the first male interface 24*a* and the first male polygon section connector body 24*b*, of the first connector 24, penetrate into the first female interface 22*d* of the polygon end cap 22.

Figure 3B:
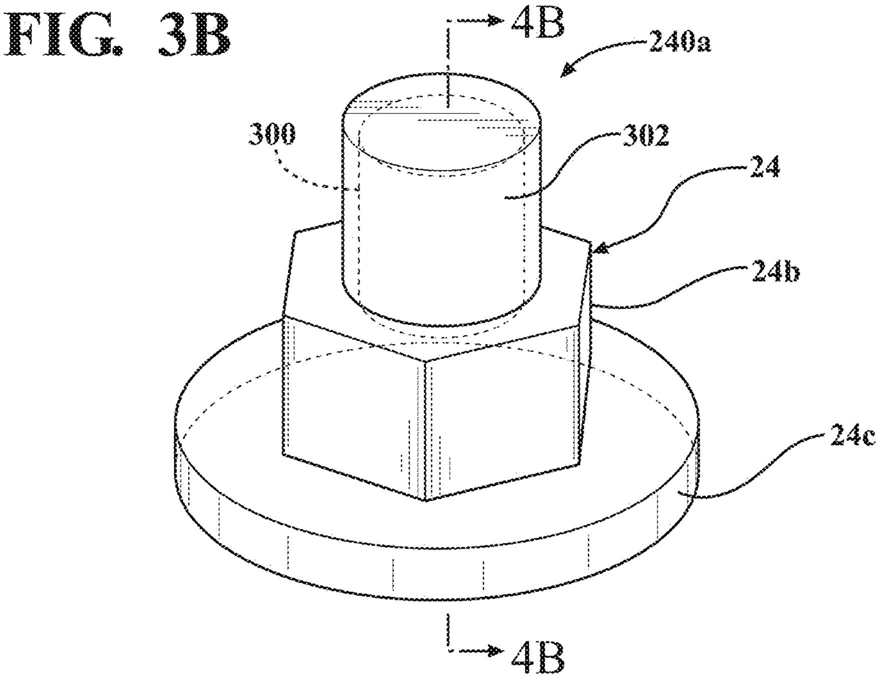
FIG. 3B is a perspective view of a connector according to another disclosed non-limiting embodiment.
Figure 4B:
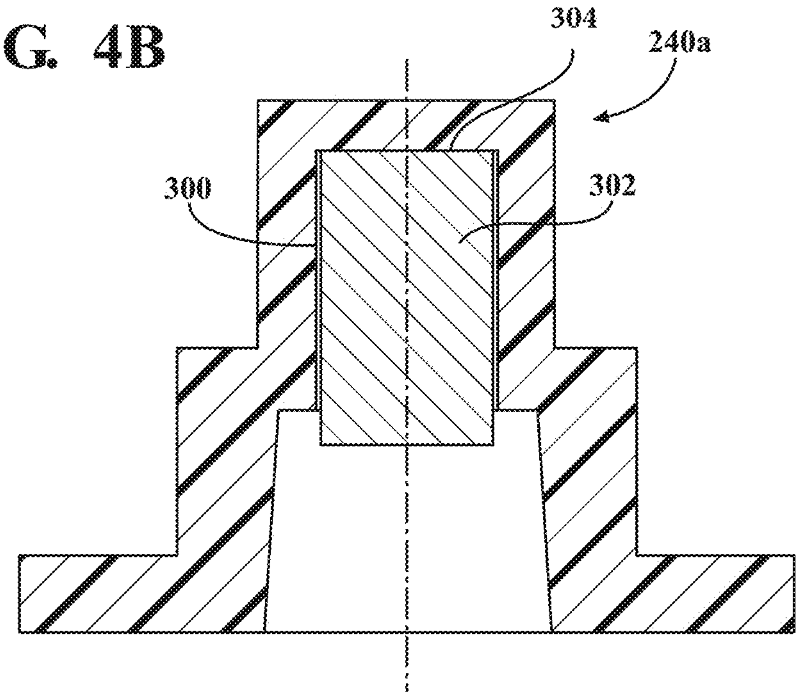
FIG. 4B is a schematic cross-sectional view of the connector of FIG. 3B according to another disclosed non-limiting embodiment.

With reference to FIGS. 3B and 4B, in another embodiment, the first male interface 240*a* includes a recess 300 within which a magnet 302 is at least partially received to be adjacent to a top surface 304 that allows for magnetic retention between the connectors. The magnetic retention may be in addition or in the alternative to the first male interface ridges 72 that insert into the first female interface ridges 70 (FIG. 4A). In one example, the magnet 302 may be cylindrical in shape. In this embodiment, the corresponding male and female interfaces may be formed as, for example, a complimentary cylindrical section as the retention therebetween is provided by the magnetic interface.

The female and/or male interfaces may alternatively or additionally include ridges or other friction including features to facilitate retention along the axis A as well rotation about axis A. In one embodiment, the first female interface ridges 70 and first male interface ridges 72 are defined about the axis A. The first male interface ridges 72 interface with the first female interface ridges 70 such that the connectors essentially "snap" together. Once the connectors are snapped together, a tool may be retained axially between each pair of connectors on the respective polygonal section but may also be individually rotated with respect to other tools.

Figure 5:
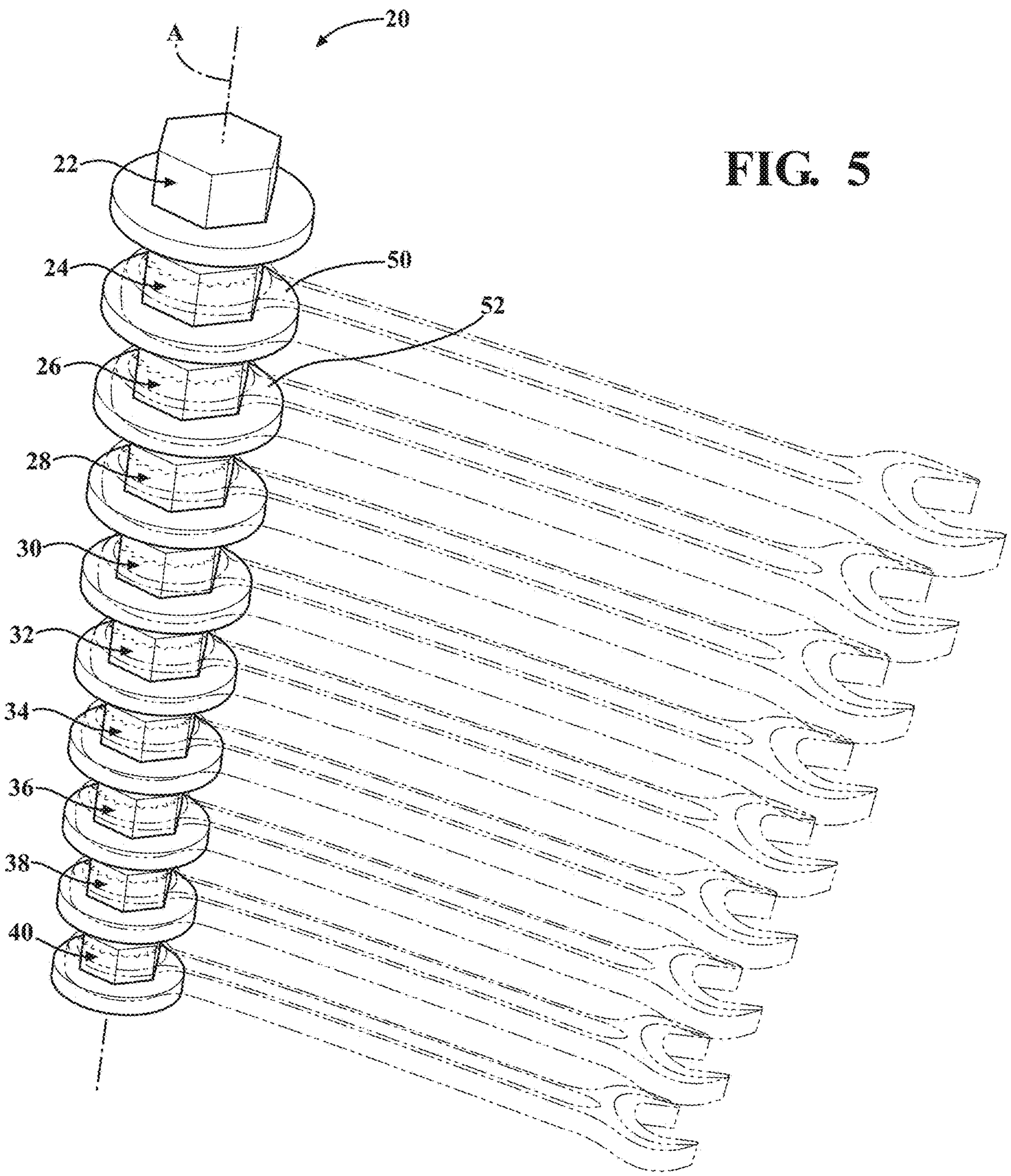
FIG. 5 is a perspective view of the toolset organizer illustrating organization of a multiple of box-end wrenches.

With reference to FIG. 5, the connectors are readily assembled together to form the toolset organizer 20 to organize an example set of box-end wrenches, each of which are of different sizes. The toolset organizer 20 facilitates organizing the box-end wrenches while allowing rotation about axis A to facilitate identification and removal of an induvial wrench. That is, the connectors can also be individually separated to access individual wrenches that may be otherwise difficult to retrieve because the desired wrench is located in the middle of the toolset organization arrangement.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

While various inventive aspects, concepts and features of the general inventive concepts are described and illustrated herein in the context of various exemplary embodiments, these various aspects, concepts, and features may be used in many alternative embodiments, either individually or in various combinations and sub-combinations thereof Unless expressly excluded herein all such combinations and sub-combinations are intended to be within the scope of the general inventive concepts. Still further, while various alternative embodiments as to the various aspects, concepts, and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed.

Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary, or representative values and ranges may be included to assist in understanding the present disclosure; however, such values and ranges are not to be construed in a limiting sense and are intended to be critical values or ranges only if so expressly stated.

Moreover, while various aspects, features and concepts may be expressly identified herein as being inventive or forming part of an invention, such identification is not intended to be exclusive, but there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A toolset organizer for organizing box-end wrenches, the toolset organizer comprising:

a multiple of connectors each comprising a male polygon section connector body adjacent to a flange along an axis, each male polygon section connector body different in size, each of the multiple of connectors at least partially receivable into another of the multiple of connectors along the axis; and a cylindrical section that extends from the male polygon section connector body along the axis of each of the multiple of connectors, the cylindrical section contains a first magnet such that the cylindrical section receivable into an opening through the flange and at least partially into the male polygon section connector body of only one of the multiple of connectors that each respectively contains a magnet to provide a magnetic interface that at least partially retains the multiple of connectors one to another.

2. The toolset organizer as recited in claim 1, wherein each male polygon section connector body comprises a hexagon different in size to receive only a single respective box-end wrench.

3. The toolset organizer as recited in claim 1, wherein each of the multiple of connectors are independently rotatable about the axis relative to the other of the multiple of connectors.

4. The toolset organizer as recited in claim 1, further comprising ridges on each cylindrical section.

5. A first connector of a toolset organizer for organizing box-end wrenches, comprising:

a first male polygon section connector body along an axis, the first male polygon section connector body sized to receive a first box-end wrench;

a first flange along the axis adjacent to the first male polygon section connector body, the first flange of diameter greater than that of the first male polygon section connector body;

a first cylindrical section that extends from the first male polygon section connector body along the axis;

an opening formed through the first flange and at least partially into the first male polygon section connector body to define a female connector portion opening to receive a second connector which comprises a second male polygon section connector body sized to receive a second box-end wrench of a size different than the first box-end wrench; wherein the first cylindrical section comprises cylindrical ridges; and wherein the first cylindrical section is sized to fit within an opening formed through a second flange and at least partially into the second male polygon section connector body of the second connector along the axis.

6. The first connector as recited in claim 5, wherein the opening formed through the second flange and at least partially into the second male polygon section connector body of the second connector comprises cylindrical ridges to facilitate retention with the first cylindrical section along the axis.

7. The first connector as recited in claim 5, wherein the first cylindrical section contains a magnet.

* * * * *